April 19, 1966  S. MOLNAR ET AL  3,247,510
MICROWAVE IDENTIFICATION OF RAILROAD CARS
Filed Oct. 4, 1963  2 Sheets-Sheet 1
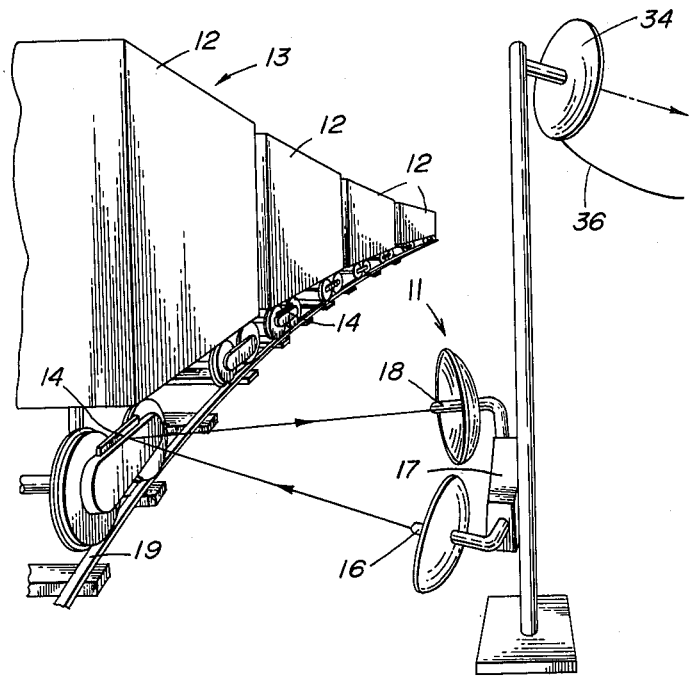
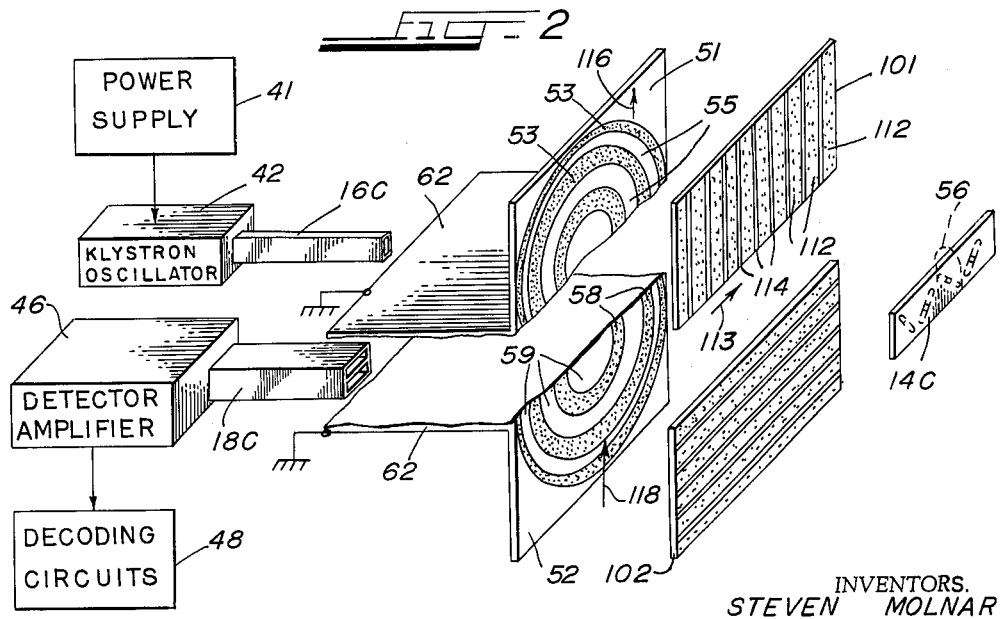
INVENTORS.
STEVEN MOLNAR
BRUCE H. SIPERLY
BY
Wallace, Kinger & Dorn

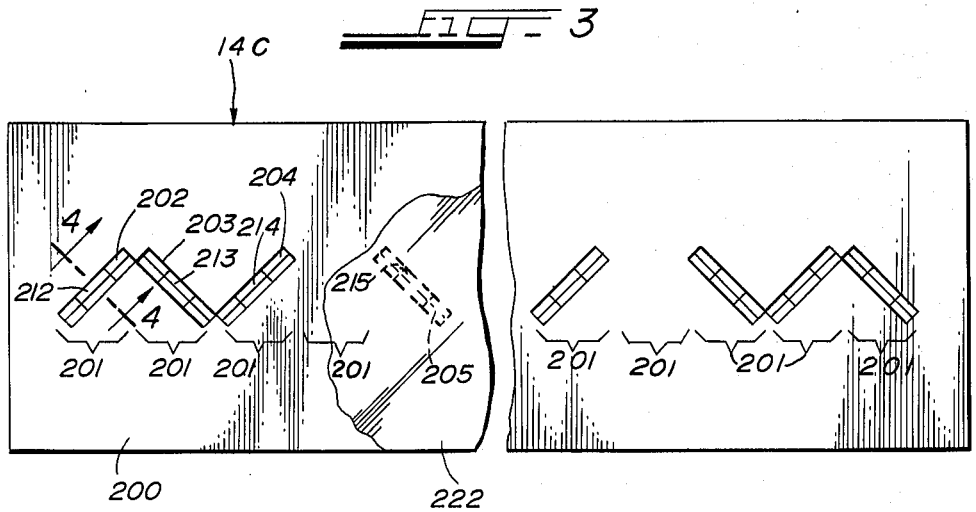
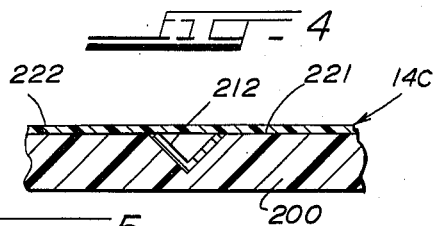
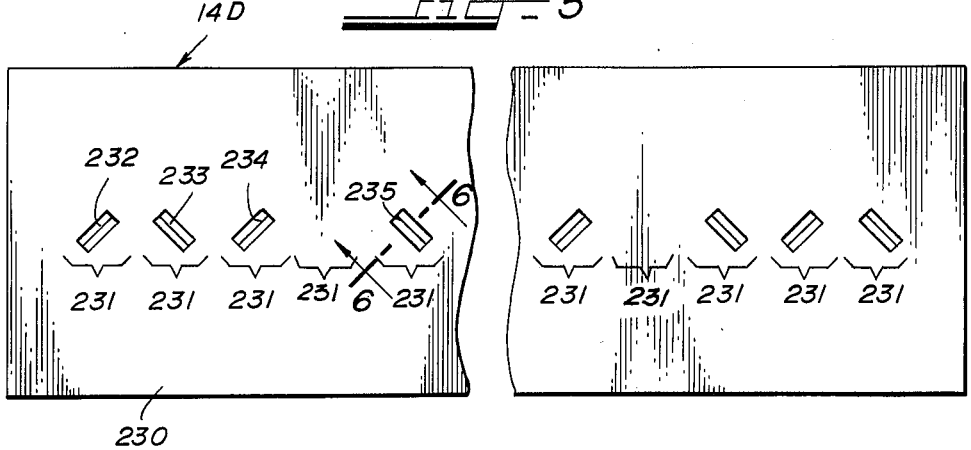
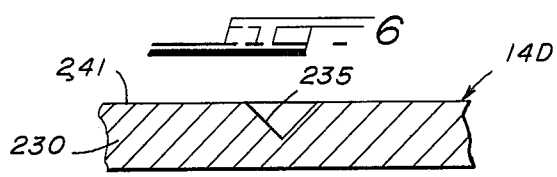
INVENTORS.
STEVEN MOLNAR
BRUCE H. SIPERLY

3,247,510
MICROWAVE IDENTIFICATION OF RAILROAD CARS
Steven Molnar, San Diego, and Bruce H. Siperly, Spring Valley, Calif., assignors, by mesne assignments, to American Brake Shoe Company, New York, N.Y., a corporation of Delaware
Filed Oct. 4, 1963, Ser. No. 313,887
4 Claims. (Cl. 343—6.8)

This invention relates to a new and improved system for identifying railroad cars and locomotives and like vehicles, and more particularly to an improved identification member construction for use in an automatic all-weather microwave car identification system.

It is critically important for railroad management to know, at all times, the locations of the locomotives and cars of a railroad system. If a car is loaded, identification of its location enables the railroad to keep the shipper and receiver posted as to progress of the car. If a car is empty, information as to its location is essential to enable use of the car when it is needed. Moreover, because both locomotives and cars require periodic service, continuing information regarding their location is important to proper servicing.

A number of different systems have been proposed to provide for automation of the reporting and recording of railroad car and locomotive location information. One particularly advantageous system is described in detail in the co-pending application of Omer F. Hamann and Sherman H. Boyd, Serial No. 160,004 filed December 18, 1961 (now abandoned and supplanted by application Serial No. 319,914, filed October 4, 1963) in which each railroad car and locomotive is provided with a relatively small coded microwave reflector identification member. In that system, each coded identification member includes a plurality of individual reflector elements, which may be constructed to be resonant at a given microwave frequency. The system further includes a roadside scanning station comprising a source of microwave signals and a microwave transmitter antenna that is coupled to the signal source. The microwave signals are radiated from the transmitter antenna and are reflected back from each coded identification member traversing the scanning station to impinge upon a receiver antenna. The coded information represented by the reflected microwave signals is subsequently detected and processed to identify the individual railway vehicles passing through the scanning station.

In the aforementioned Hamann and Boyd microwave vehicle identification system, the code signals from the identification members are changed in polarization from the original radiated signals from the microwave transmitter antenna. Thus, that system employs rotation in two different directions, from the original polarization, in order to distinguish binary "ones" from binary "zeros." But the rotation in polarization of the reflected signal is also advantageous in distinguishing that signal from the originally transmitted signal, substantially eliminating the effect of cross-talk from the transmitting antenna to the receiving antenna. Even in a system in which synchronous detection is employed, such as that disclosed and claimed in the co-pending application of William R. Bradford, Steven Molnar and Bruce H. Siperly, Serial No. 313,886, filed October 4, 1963, in which only one binary quantity is actually represented by reflected signal pulses from the identification member, it is still advantageous to provide for a change in polarization of the signal reflection from the identification member.

This change in polarization is advantageously employed in the present invention to eliminate background noise. In this system, the target is a resonant structure oriented with reception axis inclined approximately at 45 degrees to the plane of polarization for the transmitted beam. The receiving antenna system orientation is cross-polarized (90°) to the transmitting system. In this manner the receiving antenna system is insensitive to all reflections except those emanating from the resonant targets. Thus, a principal object of the invention is the elimination of background noise by uniquely employing the target with cross polarized receiving and transmitting antennas.

A problem presented in microwave vehicle identification systems pertains to the necessity of obtaining adequate resolution between adjacent individual code reflectors of the identification members. If adjacent code reflectors are substantially identical in construction and orientation, it may be difficult to distinguish the two reflected pulse signals, particularly since the microwave beam width is frequently approximately equivalent in width to the physical extent of the reflectors. Nevertheless, it is not desirable to solve this problem by simply spacing out the reflectors on the identification member, since this leads to an overly large and unwieldy identification device on each vehicle.

It is a principal object of the present invention, therefore, to provide a new and improved identification member target structure for a microwave vehicle identification system that affords optimum resolution for a given size identification member.

A specific object of the invention is to afford a microwave identification member constructed to afford a psuedo-monopulse reflection signal and thereby achieve maximum resolution with a given size identification member.

A specific object of the invention is to afford a new and improved identification member, constituting a coded reflection member for microwave signals, suitable for use in a microwave vehicle identification system, that is rugged in construction, simple and inexpensive to manufacture, yet precise in its operating characteristics.

Accordingly, the invention is directed to a coded identification member for use in an automatic vehicle identifying system comprising a roadside scanning station including a source of microwave signals of given frequency. A microwave transmitter antenna is coupled to the signal source and is used to radiate the microwave signal, polarized in a given initial direction, toward a path along which the identification member moves. A microwave receiver antenna is located adjacent the transmitter antenna to receive reflected signals from the identification member. A coded identification member constructed in accordance with the invention comprises a base member having a substantially planar surface facing the two antennas. This base member carries a plurality of individual corner reflector elements that are disposed at predetermined code positions along the base members. Individual reflector elements intercept and reflect the microwave radiations from the transmitter antenna to the receiver antenna. Each of these corner reflector elements is disposed at a substantial angle to the initial direction of polarization of the incident signal to effect a substantial change in polarization of the reflected signals from that initial direction.

Other and further objects of the present invention will be apparent from the following description and claims and are illustrated in the accompanying drawings which, by way of illustration, show preferred embodiments of the present invention and principles thereof and what is now considered to be the best mode contemplated for applying these principles. Other embodiments of the invention embodying the same or equivalent principles may be made as desired by those skilled in the art without departing from the present invention and the purview of the appended claims.

In the drawings:

FIG. 1 is a partially schematic perspective view of a trackside scanning station for an automatic vehicle identification apparatus of the kind in which the present invention is employed;

FIG. 2 is a partially schematic, partially exploded perspective view of one form of focusing lens system that may be used in the identification apparatus of FIG. 1;

FIG. 3 is a front elevation view of a part of a coded identification member constructed in accordance with one embodiment of the present invention;

FIG. 4 is a detail sectional view taken along line 4—4 in FIG. 3;

FIG. 5 is a front elevation view of a part of a coded identification member constructed in accordance with a second embodiment of the present invention; and FIG. 6 is a detail sectional view taken along line 6—6 in FIG. 5.

FIG. 1 illustrates an automatic railway car identifying apparatus 11 constructed in accordance with the system disclosed in the above-identified application of Omer F. Hamann and Sherman H. Boyd and generally illustrative of the kind of automatic identification apparatus in which the present invention may be employed. The apparatus 11 constitutes a trackside scanning station and may be a part of a system including two or more essentially similar stations. The identification apparatus 11 includes a transmitting antenna 16 and a receiving antenna 18 both connected to a circuit unit 17. The circuit unit 17 may be coupled to a centralized data processing station (not shown) by suitable means such as a transmission link comprising an antenna 34 or by a conductive line 36.

A train 13 moving past the identification apparatus 11 at the scanning station moves each individual car 12 along a given path, determined by the track 19, past the antennas 16 and 18. Each car 12 carries a plate-like identification member 14. Each identification member 14 is provided with a plurality of individual code reflector elements that are arranged in accordance with a predetermined code pattern as described more fully hereinafter. The identification members are mounted on the respective railroad cars 12 or like vehicles at a suitable location coinciding with the common focus of the two antennas 16 and 18. One suitable location for the identification plates 14, on the railway cars 12, is on the wheel carriages or trucks immediately above the springs, this location being substantially standardized with respect to height above the railway track 19.

On those relatively few cars where the illustrated truck mounting location for the identification members 14 cannot be used, a different mounting arrangement may be employed, so long as the identification plates traverse the required path coincident with the common focus of the antennas 16 and 18. The location of the identification members 14 lengthwise of the cars 12 is not critical; either truck on any given car may be selected for mounting the identification member, or the plates may be mounted at the mid-points of the cars. Preferably, there are two plates 14 for each car, one identification plate on each side of the car, so that it is not necessary to duplicate the identification apparatus 11 on the opposite side of the track 19.

In operation, a microwave signal from the circuit unit 17 is supplied to the transmitting antenna 16 and is radiated toward the path traversed by the identification members 14. In the preferred systems described in detail hereinafter, the polarization of the radiated signal is controlled so that virtually all of the radiation is limited to a given initial polarization. The radiated signal is intercepted and reflected, by the individual code reflector elements of each identification member 14, back to the receiving antenna 18. Preferably, the reflected signals are changed in polarization through an angle of approximately 90° to enable the receiving antenna 17 to distinguish the reflected signals from the initially radiated signals from transmitting antenna 16.

Reflected signals impinging upon the antenna 18 are detected to produce a pulse signal representative of the position code of the individual reflector elements along the length of the identification member 14. This pulse signal is supplied, from the circuit unit 17, to suitable storage and data processing apparatus to identify each of the railroad cars 12 moving through the scanning station at which the apparatus 11 is located.

FIG. 2 illustrates a lens system constructed in accordance with one embodiment of the invention disclosed in the aforementioned Bradford et al. application Serial No. 313,886. This lens system is utilized in conjunction with a transmitting apparatus that is essentially similar to that described above in connection with FIG. 2. The signal source for the system comprises a klystron oscillator 42 energized from a suitable power supply 41. The klystron oscillator is connected to a transmitting wave guide 16C that, in this instance, radiates a horizontally polarized microwave signal. The outlet of the radiating wave guide 16C is located immediately above a grounded conductive septum 62 that extends from the wave guide to a microwave zone plate lens 51. The radiating source represented by the right-hand end of the wave guide 16C is located at one focus of the lens 51. The outer focus of the lens is coincident with a path along which the vehicle identification members 14C are moved.

The receiving portion of the lens system is substantially similar to the transmitting portion. A second zone plate lens 52 is provided for focusing the reflected signals from the identification member 14C back to the end of a receiving wave guide 18C, located immediately below the left-hand edge of the septum 62. Preferably, the wave guide 18C is provided with a horizontally extending internal septum to reduce effective reception of horizontally polarized signals. The receiving wave guide 18C is connected to a suitable detector and amplifier circuit 46 in turn connected to de-coding circuits 48.

The lens system of FIG. 2 also includes a first polarization grid 101 interposed between the transmitting lens 51 and the identification member 14C being scanned. A similar polarization grid 102 is interposed between the identification member and the second or receiving antenna 18C. In the illustrated arrangement, the second polarization grid 102 is located between the identification member 14C and the lens 52, although it could be disposed on the opposite side of the lens. The structures of the zone plate lenses 51, 52 and of the polarization grids 101 and 102 are fully described in the aforementioned Bradford et al. application.

In operation, a microwave signal developed by the klystron oscillator 42 is radiated by the transmitter antenna wave guide 16C and is focused upon the identification member 14C, by the lens 51. The signal as originally radiated from the antenna 18 is horizontally polarized. As the signal is transmitted through the lens 51, some vertically polarized components are introduced, particularly along those parts of the lens extending at angles of 45° from the lens axis.

The horizontally polarized components of the radiated signal are transmitted without substantial attentuation through the polarization grid 101 to afford the desired horizontally polarized signal 113 impinging upon the identification member 14C. To the vertically polarized components passed by the lens 51 (see arrow 116) the grid 101 represents an effective short circuit. That is, to these signals the grid 101 appears as a wave guide operating beyond cutoff.

The microwave signal impinging upon the identification member 14C, as generally indicated by the focal outline 56 in FIG. 2, excites an individual reflector element on the identification member whenever that element is well located within the focus. As a result, the signal is reflected and re-radiated, but with a change in polarization through an angle of plus or minus 90°, depending upon the orientation of the reflector. Thus, the reflected signal impinging upon the second polarization grid 102 is vertically oriented. However, there are other stray reflections with a horizontal polarization, particularly if the identification member 14C is made of a conductive material.

The second polarization grid 102 is essentially identical in construction to the grid 101 except that it is oriented at an angle of 90° relative to the first grid. Thus, the polarization grid 102 passes vertically polarized signals without substantial attenuation. But horizontally polarized signals are effectively shorted out by the grid structure 102 and are not passed on to the lens 52. Accordingly, the signal reaching the second or receiving lens 52 is effectively limited to a vertically polarized signal as indicated by the arrow 118. This signal is focused, by the lens 52, upon the receiving antenna wave guide 18C.

In FIG. 2, the polarization grids 101 and 102 have been displaced from the lenses 51 and 52 for clarity of illustration. In actual practice, the polarization grids are mounted quite close to the lenses. Indeed, the preferred arrangement is to mount the polarization grids directly on the surface of the two Fresnel lenses. The same dielectric sheet that is employed as a part of each of the two lenses 51, 52 may also be utilized as the support member for the polarization grids 101, 102, since the raised or conductive bands affording the lens action are disposed on the surface of the lens dielectric facing the two antennas. This makes it possible to apply the conductive elements 112 affording the polarization grid on that surface of the same lens dielectric that faces the identification member 14C.

FIGS. 3 and 4 illustrate a first form of coded identification member 14C constructed in accordance with the present invention. The identification member 14C comprises a relatively thick dielectric base 200. The external dimensions of the base 200 are not critical, but are in part determined by the length of the code message to be carried by the identification members. For example, in one proposed railway vehicle identification code, some fifty-four bits of binary information are required to identify each car and to provide the necessary information for de-coding of the identifying data. An identification member 14C constructed for use in this system, with a microwave frequency of thirty-six kilomegacycles, may be approximately twenty-eight inches in length and may have a much smaller height, of the order of four to five inches. In this particular construction, one-half inch of length is allotted to each potential reflector position on the identification members.

Thus, the base member 200 includes a plurality of equally spaced code positions 201 along its length. Each of the first three code positions 201 is provided with a depression or slot that is oriented at an angle of 45° or 135° with respect to the horizontal. Thus, at the first code position 201, starting at the left-hand edge of the identification member 14C, the base member 200 is provided with a depression 202 oriented at an angle of 45°. The next code position on the base member has a depression 203 at 135°. The next code depression 204 is oriented at an angle of 45°. At the next code positions, there is no depression, whereas the subsequent depression 205 at the next code positions is oriented at an angle of 135°.

Within the depression 202 at the first code position 201 at the left-hand side of identification member 14C, there is located a small corner reflector element 212. The corner reflector 212 may be fabricated from a thin sheet of a suitable conductor, such as copper or aluminum, and adhesively bonded in the depression 202. Alternatively, the corner reflector 212 may be formed as a conductive coating on the interior walls of the depression 202. Preferably, the two walls of the corner reflector 212 are disposed at an angle of 90° to each other, although somewhat smaller angles may be employed if desired. Similar corner reflector elements 213, 214, and 215 are mounted in the depressions 203, 204 and 205, respectively, in the dielectric base 200.

It can be demonstrated that a vertically polarized microwave beam, impinging upon the corner reflector 212, is reflected without substanial attenuation in power but with a change in polarization of 90°. By the same token, an impinging vertically polarized microwave signal is reflected from each of the corner reflectors 213, 214, and 215 with a change in polarization of 90°. However, the change in polarization introduced by the reflector 213 is in the opposite direction from that afforded by the reflectors 212 and 214. To achieve the desired 90° rotation, the lines of juncture of the conductive sides of each corner reflector should each extend at angles of 45° to the vertical, as noted above.

In the construction of the identification member 14C, effective operation could be obtained with all of the corner reflectors oriented at a similar angle as, for example, 45° to the horizontal. Preferably, however, the corner reflectors at code positions immediately adjacent each other should have their apexial axes, defined by the lines of juncture of their conductive surfaces, disposed at angles of 90° to each other. This is the relationship illustrated by corner reflector 213 disposed at an angle of 90° to each other of reflectors 212 and 214. By maintaining this relationship throughout the length of the identification member 14C, the reflected signals from adjacent corner reflectors tend to cancel each other in those instances when the two corner reflectors are within the fringe portions of the focused microwave beam. This target construction produces a pseudo-monopulse operation, with respect to the reflected signals from the identification member, and provide substantially improved resolution as compared with identification members in which this relationship is not followed.

To complete the construction of the identification member 14C, it is preferable that a means be provided for protecting the small corner reflectors. This can be accomplished by painting or otherwise coating the planar surface 221 of the identification members. A preferred form of protection is afforded by mounting a thin sheet of plastic material 222 across the face 221 of the identification member to protect the corner reflectors against the weather and against physical damage.

FIGS. 5 and 6 illustrate an identification member 14D that functions in essentially the same manner as the construction 14C shown in FIGS. 3 and 4. The identification member 14D constitutes a conductive metal base member 230, along which a plurality of code positions 231 may be identified. As shown in FIG. 5, some of the code positions 231 may be blank signifying binary zeros. Binary ones may be afforded by individual corner reflectors 232, 233, 234, and 235.

The side walls of the corner reflector 232, as shown in the sectional view of FIG. 6 intersect at an angle of 90°, each side wall being at an angle of 45° to the face surface 241 of the base member 230. Moreover, and just as in the case of the identification member 14C of FIGS. 3 and 4, the juncture line of the conductive surface for the corner reflector is always disposed at an angle of 90° to the juncture line for the conductive surfaces of the next adjacent corner reflector. It is thus seen that the identification member 14D is essentially identical in operation to the identification member 14C, except that there is a greater reflection of the impinging radiation, without change of polarization, from the exposed conductive surface 241 of the all-metal identification member 14D. But this additional reflection does not adversely affect operation because the entire system must be capable of distinguishing such background reflection from the polarity-rotated code signals afforded by the corner reflectors. That is, the background reflection from the code member 14D is essentially similar in character to the reflections from other metal parts on the vehicles identified by the system, and the identification member thus introduces no additional problems in distinguishing code signals from background noise.

The all metal identification member 14D can be formed as a conductive casting or can be stamped from aluminum or other conductive metals, which require no special protection with respect to the weather or physical damage.

In the foregoing examples, illustrated in FIGS. 3–6, all of the corner reflectors are shown aligned on code positions displaced longitudinally of the base of the identification member. It is not essential, however, that a single line of corner reflectors be employed. Two or more levels of the corner reflectors can be utilized, provided the scanning apparatus 11 is conditioned to switch the microwave beam in a vertical direction to scan all of the reflector elements.

Hence, while preferred embodiments of the invention have been described and illustrated, it is to be understood that they are capable of variation and modification, and we therefore do not wish to be limited to the precise details set forth, but desire to avail ourselves of such changes and alterations as fall within the purview of the following claims.

We claim:

1. A coded identification member for use in an automatic object identifying system in which individual objects to be indentified are moved past a scanning station, said scanning station including a source of radiant energy signals of given wavelength, radiating means for radiating said signals polarized in a given initial direction, and receiving means for receiving radiant energy signals but limited to received signals polarized in a second and substantially different direction, said identification member comprising:

a base having a substantially smooth surface, adapted to be mounted on one of said objects to be identified with said surface facing the scanning station;

and a plurality of individual code elements, each comprising a corner reflector, disposed at perdetermined code positions along said base surfaces, for intercepting and reflecting said radiant signals from said radiating means back to said receiving means, each of said corner reflector elements being disposed at an angle of approximately 45° to said initial direction of polarization to effect a change of approximately 90° in polarization of the reflected signals from said initial direction to said second direction.

2. A coded identification member for use in an automatic object identifying system in which individual objects to to be identified are moved past a scanning station, said scanning station including a source of radiant energy signals of given wavelength, radiating means for radiating said signals polarized in a given initial direction, and receiving means for receiving radiant energy signals but limited to received signals polarized in a second direction substantially normal to said initial direction, said identification member comprising:

a base having a substantially smooth surface, adapted to be mounted on one of said objects to be identified with said surface facing the scanning station;

and a plurality of individual code elements, each comprising a corner reflector, disposed at predetermined code positions along said base surface and interspersed with blank code positions on said surface, each corner reflector comprising two reflector surfaces joining each other along an apexial axis at an angle of approximately 90° and disposed at angles of approximately 45° to said base surface, for intercepting and reflecting said radiant signals from said radiating means back to said receiving means, each of said corner reflector elements being disposed with its apexial axis at an angle of about 45° to said initial direction of polarization to effect a change of about 90° in polarization of the reflected signals from said initial direction to said second direction; each of said code elements having its apexial axis oriented at an angle of approximately 90° to all adjacent code elements.

3. A coded identification member according to claim 2 in which said base comprises an elongated strip of dielectric material and in which said individual code elements comprise depressions in said strip of dielectric material with the code element depressions having surfaces of conductive material.

4. A coded identification member according to claim 2 in which said base is a conductive metal member and in which said corner reflector code elements are formed as depressions in said surface of said base.

References Cited by the Examiner

Control Engineering, vol. 9, No. 3, March 1962, pages 102–104.

Control Engineering, vol. 10, No. 10, October 1963, page 86.

CHESTER L. JUSTUS, *Primary Examiner.*